(12) United States Patent
Sugiyama et al.

(10) Patent No.: US 7,852,352 B2
(45) Date of Patent: Dec. 14, 2010

(54) INFORMATION PROCESSING APPARATUS, METHOD, AND PROGRAM (75) Inventors: Katsuhiro Sugiyama, Chiba (JP); Kouji Komatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 627 days.

(21) Appl. No.: 10/578,348

(22) PCT Filed: Aug. 9, 2005

(86) PCT No.: PCT/JP2005/014573

§ 371 (c)(1),
(2), (4) Date: May 5, 2006

(87) PCT Pub. No.: WO2006/027922

PCT Pub. Date: Mar. 16, 2006

(65) Prior Publication Data

US 2007/0064015 A1 Mar. 22, 2007

(30) Foreign Application Priority Data

Sep. 7, 2004 (JP) ............................. 2004-259484

(51) Int. Cl.
*G06G 5/00* (2006.01)
(52) U.S. Cl. ....................... 345/629; 345/173
(58) Field of Classification Search .................... 345/98, 345/173, 178, 742, 660, 667, 668; 382/297–300; 715/800–801
See application file for complete search history.

(56) References Cited

U.S. PATENT DOCUMENTS

| | | |
|---|---|---|
| 5,227,771 A | 7/1993 | Kerr et al. |
| 6,252,590 B1 | 6/2001 | Sawai et al. |
| 6,384,845 B1 | 5/2002 | Takaike |
| 2003/0040962 A1* | 2/2003 | Lewis ........................... 705/14 |
| 2004/0130576 A1* | 7/2004 | Fujita et al. .................. 345/781 |
| 2005/0097476 A1* | 5/2005 | Arora et al. ................... 715/800 |

(Continued)

FOREIGN PATENT DOCUMENTS

EP 0 537 097 A1 4/1993

(Continued)

*Primary Examiner*—Chanh Nguyen
*Assistant Examiner*—Robert M Stone
(74) *Attorney, Agent, or Firm*—Finnegan, Henderson, Farabow, Garrett and Dunner, L.L.P.

(57) ABSTRACT

The present invention is capable of preventing the execution of a process, which a user does not intend to perform, when the position and size of each operation button image displayed on a screen are changed in accordance with a change in the aspect ratio of images. An aspect-ratio monitoring unit 51 monitors a change in the aspect ratio of moving images to be played back. A screen display control unit 52 controls a method for displaying moving images displayed on a display on the basis of the determined aspect ratio. A button display control unit 53 changes the size of each operation button to be displayed superimposed on the images displayed in the display. A sensitive area setting unit 54 sets an area (sensitive area) of a touch panel. An operation determining unit 55 determines which operation button is operated by the user. A command generating unit 56 generates a command signal corresponding to the determination by the operation determining unit 55 and outputs the signal to at least one appropriate part. The present invention can be applied to, e.g., camcorders.

9 Claims, 6 Drawing Sheets

U.S. PATENT DOCUMENTS

| | | | |
|---|---|---|---|
| 2005/0108656 A1* | 5/2005 | Wu et al. | 715/800 |
| 2005/0213941 A1* | 9/2005 | Taira et al. | 386/95 |
| 2006/0059438 A1* | 3/2006 | Ko et al. | 715/800 |
| 2006/0132326 A1* | 6/2006 | Fang et al. | 340/825.69 |

FOREIGN PATENT DOCUMENTS

| | | |
|---|---|---|
| EP | 0 537 097 B1 | 4/1993 |
| JP | 6-12213 | 1/1994 |
| JP | 10-124021 | 5/1998 |
| JP | 2000-10706 | 1/2000 |

\* cited by examiner

INFORMATION PROCESSING APPARATUS, METHOD, AND PROGRAM

TECHNICAL FIELD

The present invention relates to an information processing apparatus, method and program, and in particular, relates to an information processing apparatus, method and program suitable to allow a display with a touch panel to display images with a variable aspect ratio and operation input buttons.

BACKGROUND ART

Conventional television sets each include a display having an aspect ratio of 4:3. Displays with an aspect ratio of 16:9, called wide-screen displays, are becoming widespread. As the wide-screen displays are becoming popular, home camcorders with a wide-screen display capable of changing the aspect ratio of a captured image between 4:3 and 16:9 are being developed.

In playing back moving images captured by such a camcorder, in some cases, the aspect ratio of images is changed from 4:3 to 16:9 or from 16:9 to 4:3 during the playback.

Figure 1:
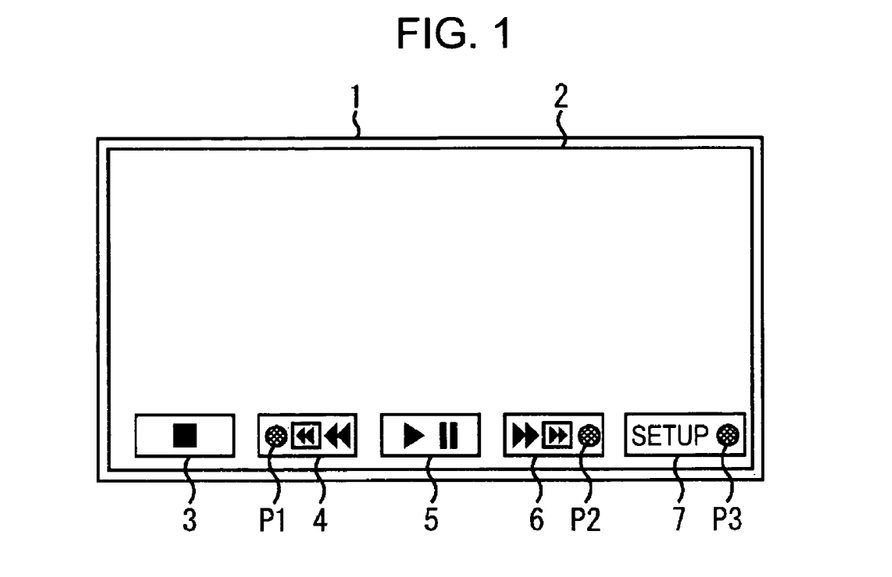
FIG. 1 is a diagram showing an example of operation button images displayed in a wide-screen display on which a touch panel is overlaid.
Figure 2:
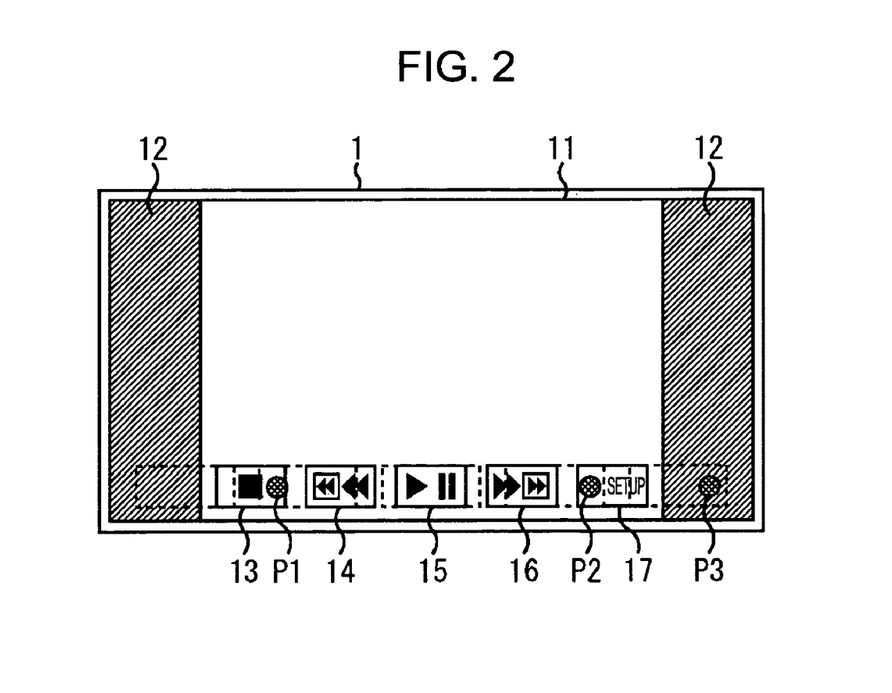
FIG. 2 is a diagram showing another example of operation button images displayed on the wide-screen display on which the touch panel is overlaid.

Assuming that moving images with the variable aspect ratio are displayed in a wide-screen display, for example, when the aspect ratio of moving images is 16:9, the whole of a display screen 1 serves as a display area 2 to display moving images as shown in FIG. 1. When the aspect ratio of moving images is 4:3, as shown in FIG. 2, non-display areas 12 are provided in both ends of the display screen 1 and a display area 11 with an aspect ratio of 4:3 is arranged in the center of the screen to display moving images.

According to a technique (refer to, e.g., Patent Document 1), when the aspect ratio of moving images is changed in a playback apparatus (e.g., a camcorder) in which a touch panel to transmit images displayed on a display is disposed on the display, display positions of various operation buttons superimposed on moving images and the sizes thereof are changed in accordance with the changed aspect ratio of moving images.

[Patent Document 1] Japanese Unexamined Patent Application Publication No. 10-124021

DISCLOSURE OF INVENTION

Problems to be Solved by the Invention

However, in the case where the display positions and sizes of the operation buttons are changed in accordance with the change in the aspect ratio of moving images as mentioned above, for example, when the aspect ratio of moving images is changed from 16:9 to 4:3 while a user is touching a point P1 in order to operate a REWIND button 4 in the screen 1 shown in FIG. 1, the user's touch on the point P1 is recognized as an operation for a STOP button 13 as shown in FIG. 2. Unfortunately, the rewind operation that is being executed is stopped.

On the other hand, when the aspect ratio of moving images is changed from 16:9 to 4:3 while the user is touching a point P2 in order to operate a FAST-FORWARD button 6 in the screen 1 shown in FIG. 1, the user's touch on the point P2 is recognized as an operation for a SETUP button 17 as shown in FIG. 2. Disadvantageously, the fast-forward operation is stopped and a setup screen is displayed.

Further, e.g., when the aspect ratio of moving images is changed from 4:3 to 16:9 while the user is touching a point P3 on the screen 1 shown in FIG. 2 without intending to perform any operation, the user's touch on the point P3 is recognized as an operation for a SETUP button 7 as shown in FIG. 1. Although the user does not intend to do so, the setup screen is displayed.

As mentioned above, according to the conventional technique, if the user touches the touch panel upon changing the aspect ratio of moving images, disadvantageously, a process which the user does not intend to perform is executed.

The present invention is made in consideration of the above disadvantages and it is an object of the present invention to prevent a process which a user does not intend to perform from being executed when the positions and sizes of operation button images displayed on a screen are changed in accordance with a change in the aspect ratio of images.

Means for Solving the Problems

The present invention provides a first information processing apparatus including: detecting means for detecting a change in the aspect ratio of images to be displayed in a display; changing means for changing the size of each operation button to be displayed superimposed on the images and the size of a sensitive area of a touch panel where a user operation for the operation buttons is recognized in accordance with the detection by the detecting means; determining means for determining which operation button corresponds to the user operation on the touch panel; and generating means for generating a command to perform a predetermined process in accordance with the determination by the determining means, wherein in a case where any of the operation buttons is continuously operated before and after the detection of the change in aspect ratio, so long as the operation button to instruct a continuous process is operated before the detection of the change in aspect ratio, the generating means generates a command to perform the continuous process corresponding to the operation button regardless of another operation button operated after the detection of the change in aspect ratio.

The present invention provides a first information processing method including: a detecting step of detecting a change in the aspect ratio of images to be displayed in a display; a changing step of changing the size of each operation button to be displayed superimposed on the images and the size of a sensitive area of a touch panel where a user operation for the operation buttons is recognized in accordance with the detection in the detecting step; a determining step of determining which operation button corresponds to the user operation on the touch panel; and a generating step of generating a command to perform a predetermined process in accordance with the determination in the determining step, wherein in the generating step, in a case where any of the operation buttons is continuously operated before and after the detection of the change in aspect ratio, so long as the operation button to instruct a continuous process is operated before the detection of the change in aspect ratio, a command to perform the continuous process-corresponding to the operation button is generated regardless of another operation button operated after the detection of the change in aspect ratio.

The present invention provides a first program that allows a computer to execute a process including: a detecting step of detecting a change in the aspect ratio of images to be displayed in a display; a changing step of changing the size of each operation button to be displayed superimposed on the images and the size of a sensitive area of a touch panel where a user operation for the operation buttons is recognized in accordance with the detection in the detecting step; a determining step of determining which operation button corresponds to the user operation on the touch panel; and a generating step of generating a command to perform a predetermined process in accordance with the determination in the determining step, wherein in the generating step, in a case where any of the operation buttons is continuously operated before and after the detection of the change in aspect ratio, so long as the operation button to instruct a continuous process is operated before the detection of the change in aspect ratio, a command to perform the continuous process corresponding to the operation button is generated regardless of another operation button operated after the detection of the change in aspect ratio.

The present invention provides a second information processing apparatus including: detecting means for detecting a change in the aspect ratio of images to be displayed in a display; changing means for changing the size of each operation button to be displayed superimposed on the images and the size of a sensitive area of a touch panel where a user operation for the operation buttons is recognized in accordance with the detection by the detecting means; determining means for determining which operation button corresponds to the user operation on the touch panel; and generating means for generating a command to perform a predetermined process in accordance with the determination by the determining means, wherein in a case where any of the operation buttons is continuously operated before and after the detection of the change in aspect ratio, the generating means generates a command to stop a process that is being executed, the process corresponding to the operation button operated before the detection of the change in aspect ratio.

The present invention provides a second information processing method including: a detecting step of detecting a change in the aspect ratio of images to be displayed in a display; a changing step of changing the size of each operation button to be displayed superimposed on the images and the size of a sensitive area of a touch panel where a user operation for the operation buttons is recognized in accordance with the detection in the detecting step; a determining step of determining which operation button corresponds to the user operation on the touch panel; and a generating step of generating a command to perform a predetermined process in accordance with the determination in the determining step, wherein in the generating step, in a case where any of the operation buttons is continuously operated before and after the detection of the change in aspect ratio, a command to stop a process that is being executed is generated, the process corresponding to the operation button operated before the detection of the change in aspect ratio.

The present invention provides a second program that allows a computer to execute a process including: a detecting step of detecting a change in the aspect ratio of images to be displayed in a display; a changing step of changing the size of each operation button to be displayed superimposed on the images and the size of a sensitive area of a touch panel where a user operation for the operation buttons is recognized in accordance with the detection in the detecting step; a determining step of determining which operation button corresponds to the user operation on the touch panel; and a generating step of generating a command to perform a predetermined process in accordance with the determination in the determining step, wherein in the generating step, in a case where any of the operation buttons is continuously operated before and after the detection of the change in aspect ratio, a command to stop a process that is being executed is generated, the process corresponding to the operation button operated before the detection of the change in aspect ratio.

According to the first information processing apparatus, method and program of the present invention, in a case where any of the operation buttons is continuously operated before and after the detection of the change in aspect ratio, when the operation button to instruct a continuous process is operated before the detection of the change in aspect ratio, a command to perform the continuous process corresponding to the operation button is generated regardless of another operation button operated after the detection of the change in aspect ratio.

According to the second information processing apparatus, method and program of the present invention, in a case where any of the operation buttons is continuously operated before and after the detection of the change in aspect ratio, a command to stop a process that is being executed is generated, the process corresponding to the operation button operated before the detection of the change in aspect ratio.

ADVANTAGES

According to the present invention, when the positions and sizes of operation button images displayed on a screen are changed in accordance with a change in the aspect ratio of images, the execution of a process which a user does not intend to perform can be prevented.

REFERENCE NUMERALS 30 camcorder, 31 control unit, 32 recording medium, 33 bus, 34 remote control receiving unit, 35 imaging unit, 36 image processing unit, 37 storage unit, 38 display, 39 touch panel, 40 remote control, 51 aspect-ratio monitoring unit, 52 image display control unit, 53 button display control unit, 54 sensitive area setting unit, 55 operation determining unit, 56 command generating unit

BEST MODE FOR CARRYING OUT THE INVENTION

Specific embodiments according to the present invention will be described in detail below with reference to the drawings.

Figure 3:
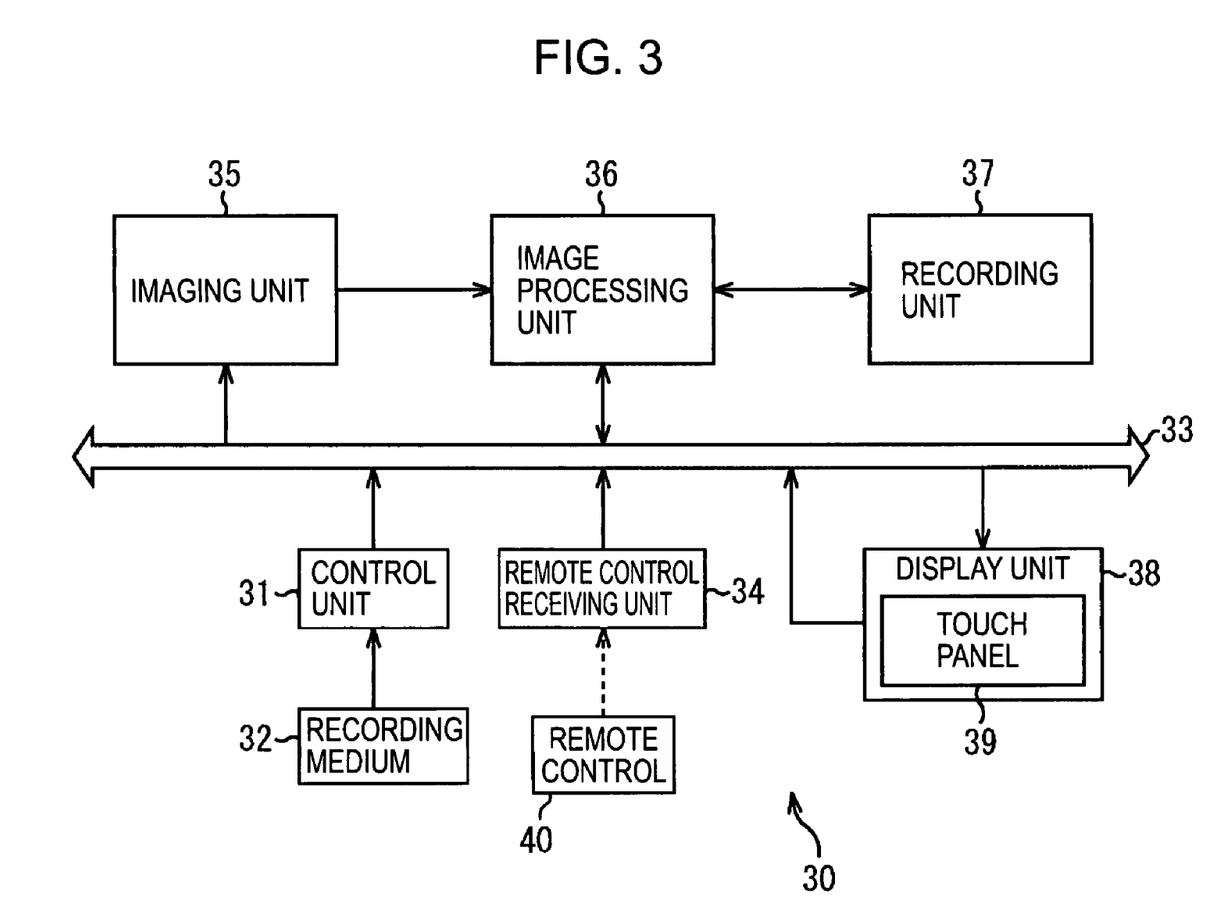
FIG. 3 is a block diagram showing an example of the structure of a camcorder to which the present invention is applied.

FIG. 3 shows an example of the structure of a camcorder according to an embodiment of the present invention. A camcorder 30 is capable of changing the aspect ratio of a captured image between 4:3 and 16:9 at arbitrary timing. The camcorder 30 plays back moving images captured and recorded.

When the aspect ratio of played moving images is 16:9, a wide-screen display 38 has a display area as shown in FIG. 1. When the aspect ratio of played moving images is 4:3, the display 38 has a display area as shown in FIG. 2. A touch panel 39 to transmit images displayed in the display 38 is overlaid on the display 38. The touch panel 39 detects an operation by a user who intends to press one of operation buttons (e.g., a STOP button 3, a PLAY button 5, and similar buttons in FIG. 1) displayed in the display 38 so that a process corresponding to a result of the detection is executed.

A control unit 31 controls respective components of the camcorder 30 in accordance with a user operation for the touch panel 39 or that for a remote control 40 on the basis of a control program recorded in a recording medium 32. In addition, the control unit 31 generates image signals corresponding to the operation buttons displayed in the display 38 and outputs the signals to an image processing unit 36 via a bus 33.

A remote control receiving unit 34 receives a signal transmitted from the remote control 40 in response to a user operation and outputs an operation signal corresponding to the received signal to the control unit 31 via the bus 33.

An imaging unit 35 includes a lens, a diaphragm, a shutter, a CCD (Charge Coupled Device), a CDS (Correlated Double Sampling) circuit, an AGC (Auto Gain-Control) circuit, and an A/D (Analog Digital) converter which are not shown. The imaging unit 35 converts an optical image of an object into electric image signals and outputs the image signals to the image processing unit 36.

The image processing unit 36 performs predetermined image processing to the image signals supplied from the imaging unit 35 and outputs the resultant signals to the display 38 through the bus 33. In addition, the image processing unit 36 compresses and encodes the image signals supplied from the imaging unit 15 and outputs obtained encoded data to a recording unit 37. It is assumed that the encoded data includes information indicative of the aspect ratio of captured image signals. Further, the image processing unit 36 decompresses encoded data supplied from the recording unit 37 to obtain an image, superimposes operation button images supplied from the control unit 31 through the bus 33 on the obtained image, and outputs the resultant data to the display 38. The image processing unit 36 also outputs information indicative of the aspect ratio of image signals to the control unit 31, the image signals being obtained by decompressing encoded data supplied from the recording unit 37.

The recording unit 37 records encoded data supplied from the image processing unit 36 on a predetermined recording medium. In addition, the recording unit 37 reads encoded data recorded on the predetermined recording medium and outputs the read data to the image processing unit 36.

The display 38 displays an image corresponding to image signals supplied from the control unit 31 through the bus 33. The touch panel 39 overlaid on the display 38 is transparent such that the screen of the display 38 is visible. The touch panel 39 detects a touch by a user who intends to press any of the operation buttons displayed on the display 38 and outputs coordinate information indicative of a position where the user has touched to the control unit 31 through the bus 33.

Figure 4:
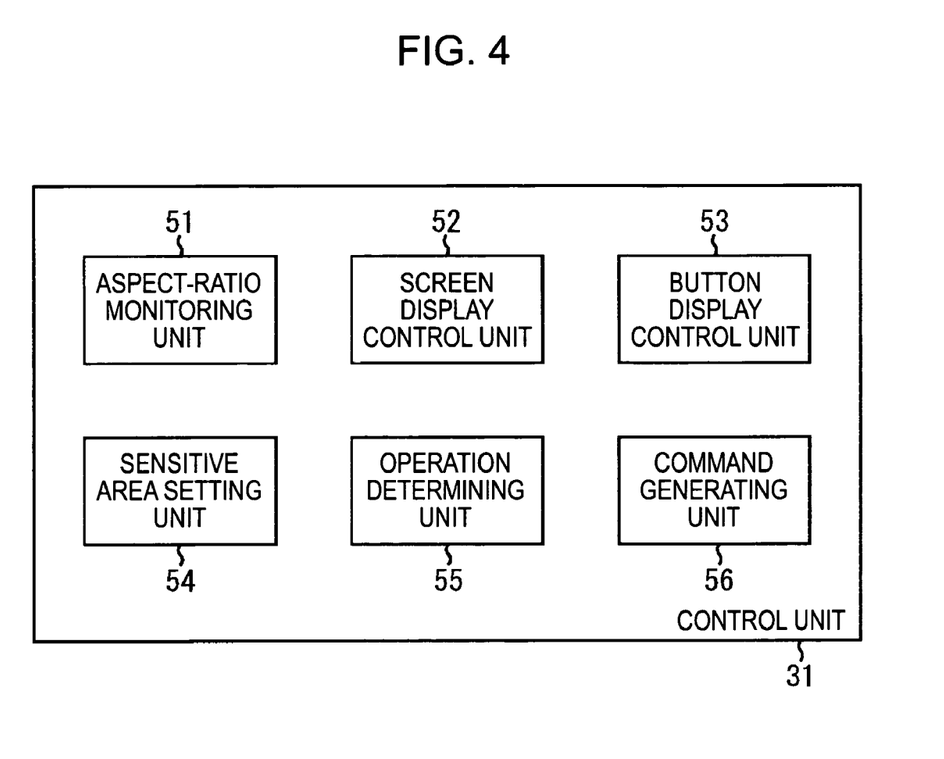
FIG. 4 is a block diagram showing an example of the structure of a control unit in FIG. 3.

FIG. 4 shows an example of the detailed structure of the control unit 31. An aspect-ratio monitoring unit 51 determines the aspect ratio of moving images, which are read by the recording unit 37 and are played back by the image processing unit 36, on the basis of information indicative of the aspect ratio supplied from the image processing unit 36 and also monitors a change in aspect ratio. A screen display control unit 52 controls the image processing unit 36 on the basis of the aspect ratio determined by the aspect-ratio monitoring unit 51 with respect to a method for displaying moving images in the display 38 (i.e., when the aspect ratio is 16:9, displaying moving images in the whole screen as shown in FIG. 1, or when the aspect ratio is 4:3, displaying moving images in a display area 11 in the center of the screen as shown in FIG. 2).

A button display control unit 53 reads image data (hereinafter, also referred to as button data) of the operation buttons to be displayed in the display 38 from the recording medium 32, processes the data so as to change the size of each button on the basis of the aspect ratio determined by the aspect-ratio monitoring unit 51, and outputs the resultant data to the image processing unit 36. A sensitive area setting unit 54 sets an area (sensitive area) of the touch panel 39 to determine whether any of the operation buttons displayed in the display 38 is pressed. An operation determining unit 55 determines which operation button is operated by the user on the basis of coordinate information supplied from the touch panel 39 through the bus 33 and the setting by the sensitive area setting unit 54. The operation determining unit 55 has a button-operation handling flag. The flag is turned on so long as a process corresponding to a pressed one-time button, which will be described below, has already been executed. When the process is not yet executed, the flag is turned off. A command generating unit 56 generates a command signal corresponding to a result of the determination by the operation determining unit 55 and outputs the signal to at least one appropriate part through the bus 33.

Two kinds of processes (hereinafter, referred to as first and second button-operation handling processes) will now be described, each process being executed when a certain operation button displayed in the display 38 is pressed upon changing the aspect ratio of moving images that are being played back. The camcorder 30 executes either the first or second button-operation handling process, which will be described below.

Figure 5:
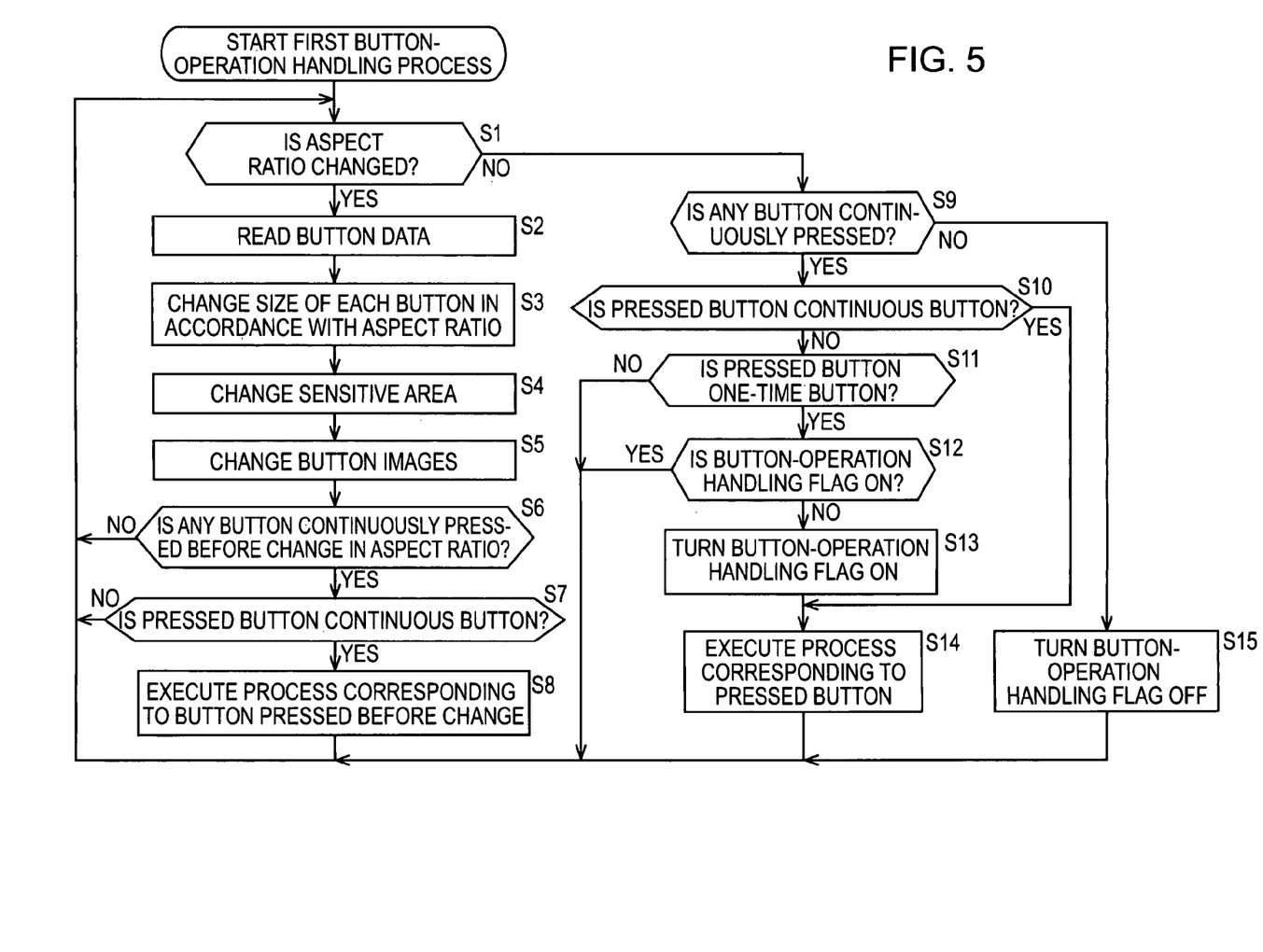
FIG. 5 is a flowchart explaining a first button-operation handling process.

The first button-operation handling process will now be described with reference to a flowchart of FIG. 5. The first button-operation handling process is started at the time when the recording unit 37 reads encoded data of moving images from a predetermined recording medium, the image processing unit 36 plays back the read encoded data, and the display 38 displays the played moving images and operation button images superimposed on the moving images, i.e., when a screen as shown in FIG. 1 or 2 is displayed.

In step S1, the aspect-ratio monitoring unit 51 determines, on the basis of information indicative of the aspect ratio of moving images that are being played back, whether the aspect ratio of moving images is changed during playback, the information being supplied from the image processing unit 36. If it is determined that the aspect ratio of played moving images is changed, the process proceeds to step S2. In step S2, the button display control unit 53 reads button data, serving as image data of the operation buttons, from the recording medium 32. In step S3, the button display control unit 53 changes the button data such that the display size of each operation button matches the changed aspect ratio and outputs the resultant data to the image processing unit 36 via the bus 33.

In step S4, the sensitive area setting unit 54 changes the sensitive area of the touch panel 39 such that the area matches the button data changed in step S3. In step S5, the image processing unit 36 changes the operation button images superimposed on the moving images using the button data changed in step S3.

In step S6, the operation determining unit 55 determines whether any one of the operation buttons is continuously pressed (i.e., whether the user is touching the touch panel 39) before the aspect ratio is changed. If it is determined that any operation button is not pressed before the aspect ratio is changed, the process is returned to step S1. Step S1 and subsequent steps are repeated. On the other hand, when it is determined that any one of the operation buttons is continuously pressed before the aspect ratio is changed, the process proceeds to step S7.

In step S7, the operation determining unit 55 determines whether the operation button pressed before the change in aspect ratio is a continuous button.

Each continuous button is operated to instruct continuing the corresponding predetermined process only while being pressed. The continuous buttons include, e.g., the REWIND PLAY buttons 4 and 14 and the FAST-FORWARD PLAY buttons 6 and 16 in FIGS. 1 and 2. On the other hand, each button that is not a continuous button is called a one-time button which is operated to instruct starting or terminating the corresponding predetermined process when being pressed once. The one-time buttons include, e.g., the STOP buttons 3 and 13, the PLAY buttons 5 and 15, and the SETUP buttons 7 and 17 in FIGS. 1 and 2.

When it is determined in step S7 that the button continuously pressed before the change in aspect ratio is not a continuous button, the process is returned to step S1. Step S1 and subsequent steps are repeated. In this case, therefore, a process corresponding to the pressed operation button is not executed, thus preventing a malfunction.

On the other hand, if it is determined that the button continuously pressed before the change in aspect ratio is a continuous button, the process proceeds to step S8. In step S8, the command generating unit 56 generates a command corresponding to the pressed continuous button and outputs the command to at least one appropriate part. In response to the command, a process executed before the change in aspect ratio is continuously performed.

When it is determined in step S1 that the aspect ratio of moving images is not changed during playback, the process proceeds to step S9. In step S9, the operation determining unit 55 determines whether any operation button is pressed. When it is determined that any one of the operation buttons is pressed, the process proceeds to step S10. In step 10, the operation determining unit 55 determines whether the pressed operation button is a continuous button. If it is determined that the pressed button is not a continuous button, the process proceeds to step S11. In step S11, the operation determining unit 55 determines whether the pressed operation button is a one-time button. When it is determined that the pressed button is a one-time button, the process proceeds to step S12.

In step S12, the operation determining unit 12 determines whether the button-operation handling flag held therein is on, the flag indicating whether a process corresponding to the one-time button has already been executed. When it is determined that the button-operation handling flag is not on, the flag is turned on in step S13. In step S14, the command generating unit 56 generates a command corresponding to the pressed operation button (in this case, the one-time button) and outputs the command to at least one appropriate part. In response to the command, a process corresponding to the pressed one-time button is executed.

When it is determined in step S10 that the pressed operation button is a continuous button, steps S11 to S13 are skipped. The process proceeds to step S14. In step S14, a command corresponding to the pressed operation button (in this case, the continuous button) is generated and is then output to at least one appropriate part. In response to the command, a process corresponding to the pressed continuous button is executed.

When it is determined in step S11 that the pressed operation button is not a one-time button, alternatively, when it is determined in step S12 that the button-operation handling flag is on, the process is returned to step S1. Step S1 and subsequent steps are repeated.

When it is determined in step S9 that any operation button is not pressed, the process proceeds to step S15. In step S15, the operation determining unit 55 turns the button-operation handling flag off. After that, the process is returned to step S1. Step S1 and subsequent steps are repeated.

As mentioned above, according to the first button-operation handling process, when the aspect ratio of moving images that are being played back is changed while any of the operation buttons is being pressed, so long as the operation button pressed before the change in aspect ratio is a continuous button, a process executed before the change in aspect ratio is continued, although the display size of each operation button and the sensitive area are changed in accordance with the changed aspect ratio. Therefore, it is possible to prevent the execution of a process, which the user does not intend to perform, when the aspect ratio is changed. The explanation of the first button-operation handling process is completed.

Figure 6:
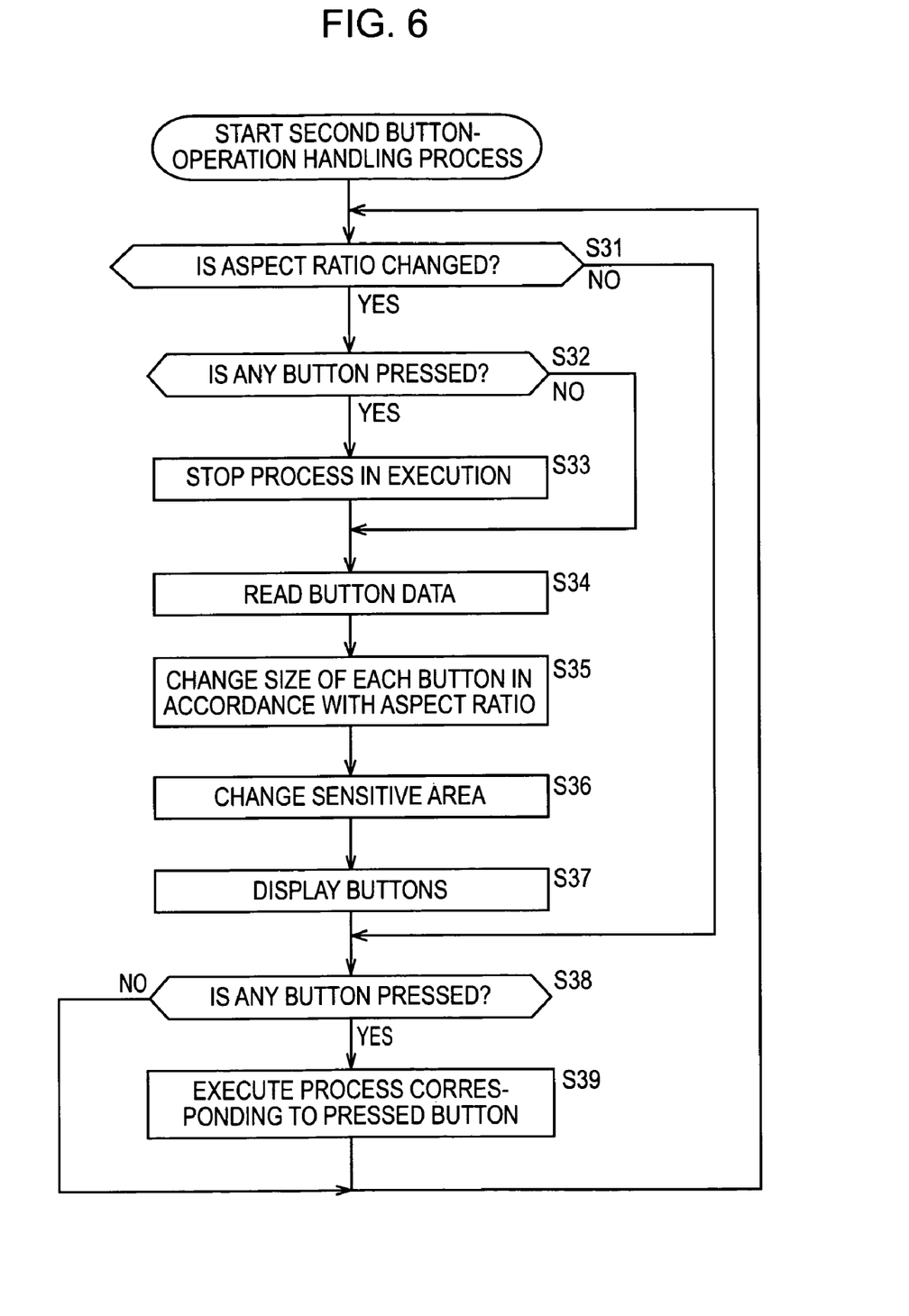
FIG. 6 is a flowchart explaining a second button-operation handling process.

A second button-operation handling process will be described below with reference to a flowchart of FIG. 6. The second button-operation handling process is started at the time when the recording unit 37 reads encoded data of moving images from a predetermined recording medium, the image processing unit 36 plays back the read encoded data, and the display 38 displays the played moving images on which the operation button images are superimposed, i.e., when a screen as shown in FIG. 1 or 2 is displayed.

In step S31, the aspect-ratio monitoring unit 51 determines, on the basis of information which indicates the aspect ratio of moving images that are being played back and is supplied from the image processing unit 36, whether the aspect ratio of moving images is changed during playback. When it is determined that the aspect ratio of moving images is changed during playback, the process proceeds to step S32. If it is determined that the aspect ratio of moving images is not changed during playback, steps S32 to 37 are skipped. The process proceeds to step S38.

In step S32, the operation determining unit 55 determines whether any of the operation buttons is continuously pressed (i.e., the user is touching the touch panel 39) before the aspect ratio is changed. When it is determined that any of the operation buttons is continuously pressed before the change in aspect ratio, the process proceeds to step S33. In step S33, the command generating unit 56 generates a command to stop a process that is being executed in response to the pressing of the corresponding operation button and outputs the command to at least one appropriate part. In response to the command, the process which is being executed before the change in aspect ratio is stopped regardless of the type of button.

When it is determined in step S32 that any operation button is not pressed before the change in aspect ratio, the process skips step S33 and proceeds to step S34. In step S34, the button display control unit 53 reads button data, serving as image data of the operation buttons, from the recording medium 32. In step S35, the button display control unit 53 changes the button data such that the display size of each operation button matches the changed aspect ratio and outputs the resultant data to the image processing unit 36 via the bus 33. In step S36, the sensitive area setting unit 54 changes the sensitive area of the touch panel 39 such that the area matches the button data changed in step S35. In step S37, the image processing unit 36 changes the operation button images superimposed on the moving images using the button data changed in step S35.

In step S38, the operation determining unit 55 determines whether any of the operation buttons is pressed. If it is determined that any of the operation buttons is pressed, the process proceeds to step S39. In step S39, the command generating unit 56 generates a command to execute a process corresponding to the pressed operation button and outputs the command to at least one appropriate part. In response to the command, the process corresponding to the pressed operation button is executed.

If it is determined in step S38 that any operation button is not pressed, step S39 is skipped. The process is returned to step S31. Step S31 and subsequent steps are repeated.

As mentioned above, according to the second button-operation handling process, when the aspect ratio of moving images that are being played back is changed while any of the operation buttons is being pressed, a process that is being executed in response to the pressing of the corresponding operation button is temporarily stopped. The display size of each operation button and the sensitive area are changed and, after that, which operation button is being pressed is determined. The corresponding process is then executed. Thus, it is possible to prevent the execution of a process, which the user does not intend to perform, when the aspect ratio is changed. The explanation of the second button-operation handling process is completed.

The present invention can be applied not only to camcorders like that according to the present embodiment but also to electronic apparatuses each having a display on which a touch panel is overlaid.

Figure 7:
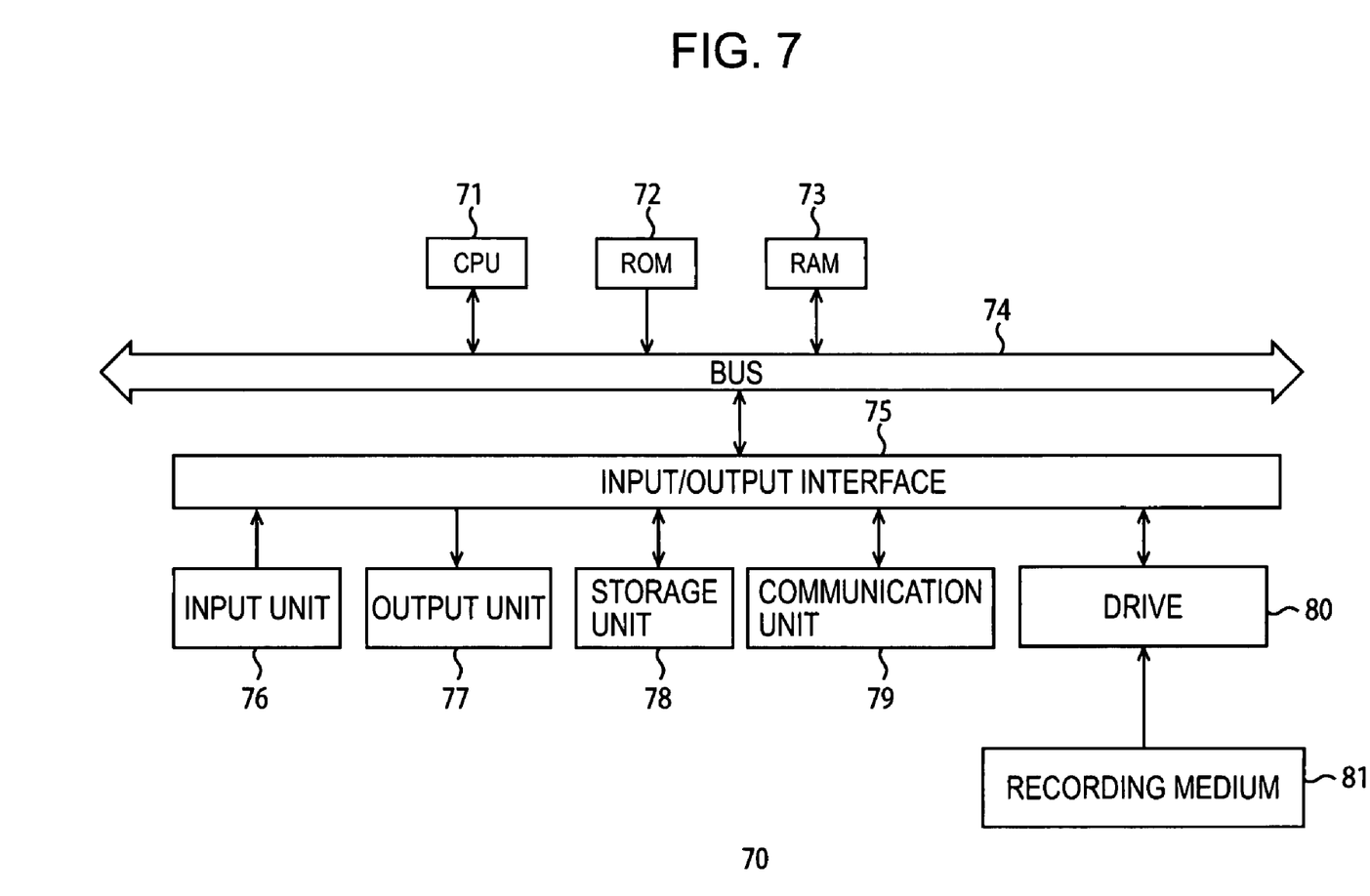
FIG. 7 is a block diagram showing an example of the structure of a general-purpose personal computer.

The above-mentioned series of steps can be executed by either hardware or software. To execute the series of steps by software, a program constituting the software is installed from a recording medium into a computer incorporated in dedicated hardware or a general-purpose personal computer, e.g., as shown in FIG. 7, capable of executing various functions according to various programs installed therein.

Such a personal computer 70 has a CPU (Central Processing Unit) 71 therein. The CPU 71 is connected to an input/output interface 75 through a bus 74. A ROM (Read Only Memory) 72 and a RAM (Random Access Memory) 73 are connected to the bus 74.

The input/output interface 75 is connected to an input unit 76, an output unit 77, a storage unit 78, and a communication unit 79. The input unit 76 includes an input device, such as a keyboard whereby the user enters an operation command and/or a mouse. The output unit 77 includes a display, e.g., a CRT (Cathode Ray Tube) or an LCD (Liquid Crystal Display), for displaying video signals. The storage unit 78 includes a hard disk drive for storing at least one program and various data blocks. The communication unit 79 includes a modem and a LAN (Local Area Network) adapter to execute communication processing through a network, notably the Internet. In addition, the input/output interface 75 is connected to a drive 80 for reading and writing data from/to a recording medium 81, such as a magnetic disk (including a flexible disk), an optical disk (including a CD-ROM (Compact Disc-Read Only memory) or a DVD (Digital Versatile Disc)), a magneto-optical disk (including an MD (Mini Disc)), or a semiconductor memory.

A program to allow the personal computer 70 to execute the above-mentioned series of steps is stored in the recording medium 81 and is then provided to the personal computer 70. The program is read by the drive 80 and the read program is then installed into the hard disk drive in the storage unit 78. The program installed in the storage unit 78 is loaded from the storage unit 78 into the RAM 73 in accordance with an instruction generated from the CPU 71 in response to a command entered by the user through the input unit 76. The loaded program is executed.

In the present specification, steps executed on the basis of the program include steps executed in time series in the above-described order and those executed not always time-serially but in parallel or individually.

The program may be processed by either one computer or a plurality of computers in a distributed manner. Further, the program may be transferred to a remote computer such that the program is executed in a remote control manner.

The invention claimed is:

1. An information processing apparatus for performing a predetermined process in accordance with a user operation on a touch panel overlaid on a display, the apparatus comprising:
   detecting means for detecting a change in an aspect ratio of images to be displayed in the display;
   changing means for:
      changing a size of operation buttons after detecting the change in the aspect ratio, the operation buttons displayed superimposed on the images before and after the change in the aspect ratio, and
      changing a size of a sensitive area of the touch panel where user operations of the operation buttons are recognized, in accordance with the detection by the detecting means;
   determining means for determining a first operation button that corresponds to the user operation on the touch panel, wherein the first operation button is displayed in a screen area before the change in aspect ratio and is replaced by a second operation button that is displayed in the screen area after the change in aspect ratio; and
   generating means for generating a command to perform the predetermined process in accordance with the determination by the determining means, and generating the command when the screen area is continually selected during the change in aspect ratio, the change in aspect ratio causing the first operation button to be replaced by the second operation button in the screen area, wherein
   when the first operation button is continuously operated before and after the detection of the change in aspect ratio and the predetermined process is a continuous process, the generating means generates the command to perform the predetermined process while the first operation button is operated, regardless of the second operation button operated after the detection of the change in aspect ratio.

2. The information processing apparatus of claim 1, wherein the continuous process comprises at least one of rewind and fast forward.

3. An information processing method for performing a predetermined process in accordance with a user operation on a touch panel overlaid on a display, the method comprising:
   detecting a change in an aspect ratio of images to be displayed in the display;
   changing a size of operation buttons after detecting the change in the aspect ratio, the operation buttons displayed superimposed on the images before and after the change in the aspect ratio;
   changing a size of a sensitive area of the touch panel where user operations of the operation buttons are recognized, in accordance with the detecting;

determining a first operation button that corresponds to the user operation on the touch panel, wherein the first operation button is displayed in a screen area before the change in aspect ratio and is replaced by a second operation button that is displayed in the screen area after the change in aspect ratio; and generating a command to perform the predetermined process in accordance with the determining, and generating the command when the screen area is continually selected during the change in aspect ratio, the change in aspect ratio causing the first operation button to be replaced by the second operation button in the screen area, wherein when the first operation button is continuously operated before and after the detection of the change in aspect ratio and the predetermined process is a continuous process, the generating further generates the command to perform the predetermined process while the first operation button is operated, regardless of the second operation button operated after the detection of the change in aspect ratio.

4. The information processing method of claim 3, wherein the continuous process comprises at least one of rewind and fast forward.

5. A non-transitory computer-readable medium storing program instructions, which, when executed by a processor, cause the processor to perform a method for performing a predetermined process in accordance with a user operation on a touch panel overlaid on a display, the method comprising:

detecting a change an aspect ratio of images to be displayed in the display;

changing a size of operation buttons after detecting the change in the aspect ratio, the operation buttons displayed superimposed on the images before and after the change in the aspect ratio;

changing a size of a sensitive area of the touch panel where user operations of the operation buttons are recognized, in accordance with the detecting;

determining a first operation button that corresponds to the user operation on the touch panel, wherein the first operation button is displayed in a screen area before the change in aspect ratio and is replaced by a second operation button that is displayed in the screen area after the change in aspect ratio; and generating a command to perform the predetermined process in accordance with the determining, and generating the command when the screen area is continually selected during the change in aspect ratio, the change in aspect ratio causing the first operation button to be replaced by the second operation button in the screen area, wherein when the first operation button is continuously operated before and after the detection of the change in aspect ratio and the predetermined process is a continuous process, the generating further generates the command to perform the predetermined process while the first operation button is operated, regardless of the second operation button operated after the detection of the change in aspect ratio.

6. The computer-readable medium of claim 5, wherein the continuous process comprises at least one of rewind and fast forward.

7. An information processing apparatus for performing a predetermined process in accordance with a user operation on a touch panel overlaid on a display, the apparatus comprising:

detecting means for detecting a change in an aspect ratio of images to be displayed in the display;

changing means for:
changing a size of operation buttons after detecting the change in the aspect ratio, the operation buttons displayed superimposed on the images before and after the change in the aspect ratio, and changing a size of a sensitive area of the touch panel where user operations of the operation buttons are recognized, in accordance with the detection by the detecting means;

determining means for determining a first operation button that corresponds to the user operation on the touch panel, wherein the first operation button is displayed in a screen area before the change in aspect ratio and is replaced by a second operation button that is displayed in the screen area after the change in aspect ratio; and generating means for generating a command to perform the predetermined process in accordance with the determination by the determining means, and generating the command when the screen area is continually selected during the change in aspect ratio, the change in aspect ratio causing the first operation button to be replaced by the second operation button in the screen area, wherein when the first operation button is continuously operated before and after the detection of the change in aspect ratio, the generating means generates the command to stop the predetermined process that is being executed, the predetermined process corresponding to the first operation button operated before the detection of the change in aspect ratio.

8. An information processing method for performing a predetermined process in accordance with a user operation on a touch panel overlaid on a display, the method comprising:

detecting a change in an aspect ratio of images to be displayed in the display;

changing a size of operation buttons after detecting the change in the aspect ratio, the operation buttons displayed superimposed on the images before and after the change in the aspect ratio;

changing a size of a sensitive area of the touch panel where user operations of the operation buttons are recognized, in accordance with the detecting;

determining a first operation button that corresponds to the user operation on the touch panel, wherein the first operation button is displayed in a screen area before the change in aspect ratio and is replaced by a second operation button that is displayed in the screen area after the change in aspect ratio; and generating a command to perform the predetermined process in accordance with the determining, and generating the command when the screen area is continually selected during the change in aspect ratio, the change in aspect ratio causing the first operation button to be replaced by the second operation button in the screen area, wherein when the first operation button is continuously operated before and after the detection of the change in aspect ratio, the command to stop the predetermined process that is being executed is generated, the predetermined process corresponding to the first operation button operated before the detection of the change in aspect ratio.

9. A non-transitory computer-readable medium storing program instructions, which, when executed by a processor, cause the processor to perform a method for performing a predetermined process in accordance with a user operation on a touch panel overlaid on a display, the method comprising:

detecting a change in an aspect ratio of images to be displayed in the display;

changing a size of operation buttons after detecting the change in the aspect ratio, the operation buttons displayed superimposed on the images before and after the change in the aspect ratio;

changing a size of a sensitive area of the touch panel where user operations of the operation buttons are recognized, in accordance with the detecting;

determining a first operation button that corresponds to the user operation on the touch panel, wherein the first operation button is displayed in a screen area before the change in aspect ratio and is replaced by a second operation button that is displayed in the screen area after the change in aspect ratio; and generating a command to perform the predetermined process in accordance with the determining, and generating the command when the screen area is continually selected during the change in aspect ratio, the change in aspect ratio causing the first operation button to be replaced by the second operation button in the screen area, wherein when the first operation button is continuously operated before and after the detection of the change in aspect ratio, a command to stop the predetermined process that is being executed is generated, the predetermined process corresponding to the first operation button operated before the detection of the change in aspect ratio.

* * * * *